(No Model.) 3 Sheets—Sheet 1.
V. HIMMER.
ELECTRIC SELF WINDING CLOCK.
No. 391,969. Patented Oct. 30, 1888.
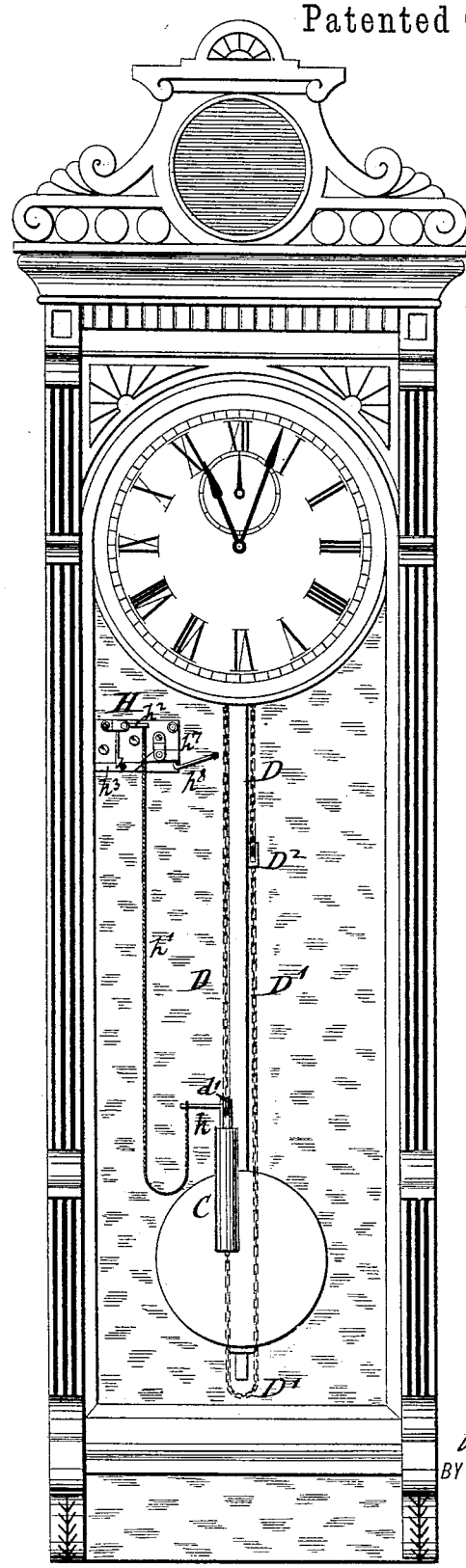
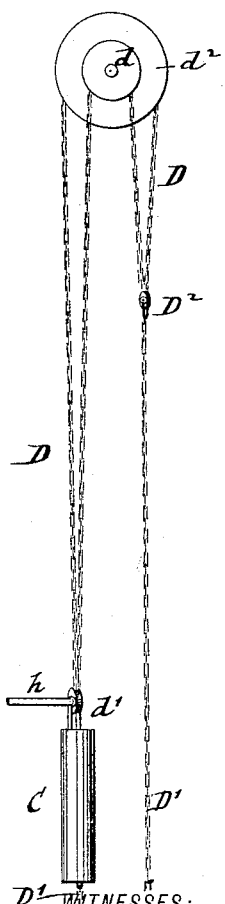
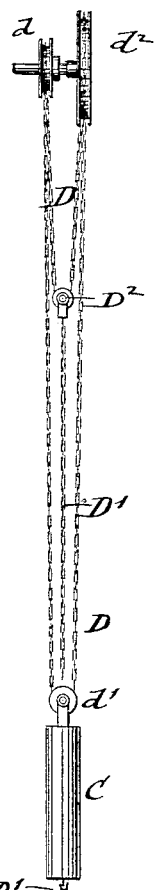
WITNESSES:
A. Schehl.
Sidney Mason
INVENTOR:
Vitalis Himmer,
BY Gospel & Raegener,
ATTORNEYS.

(No Model.) 3 Sheets—Sheet 2.
V. HIMMER.
ELECTRIC SELF WINDING CLOCK.
No. 391,969. Patented Oct. 30, 1888.
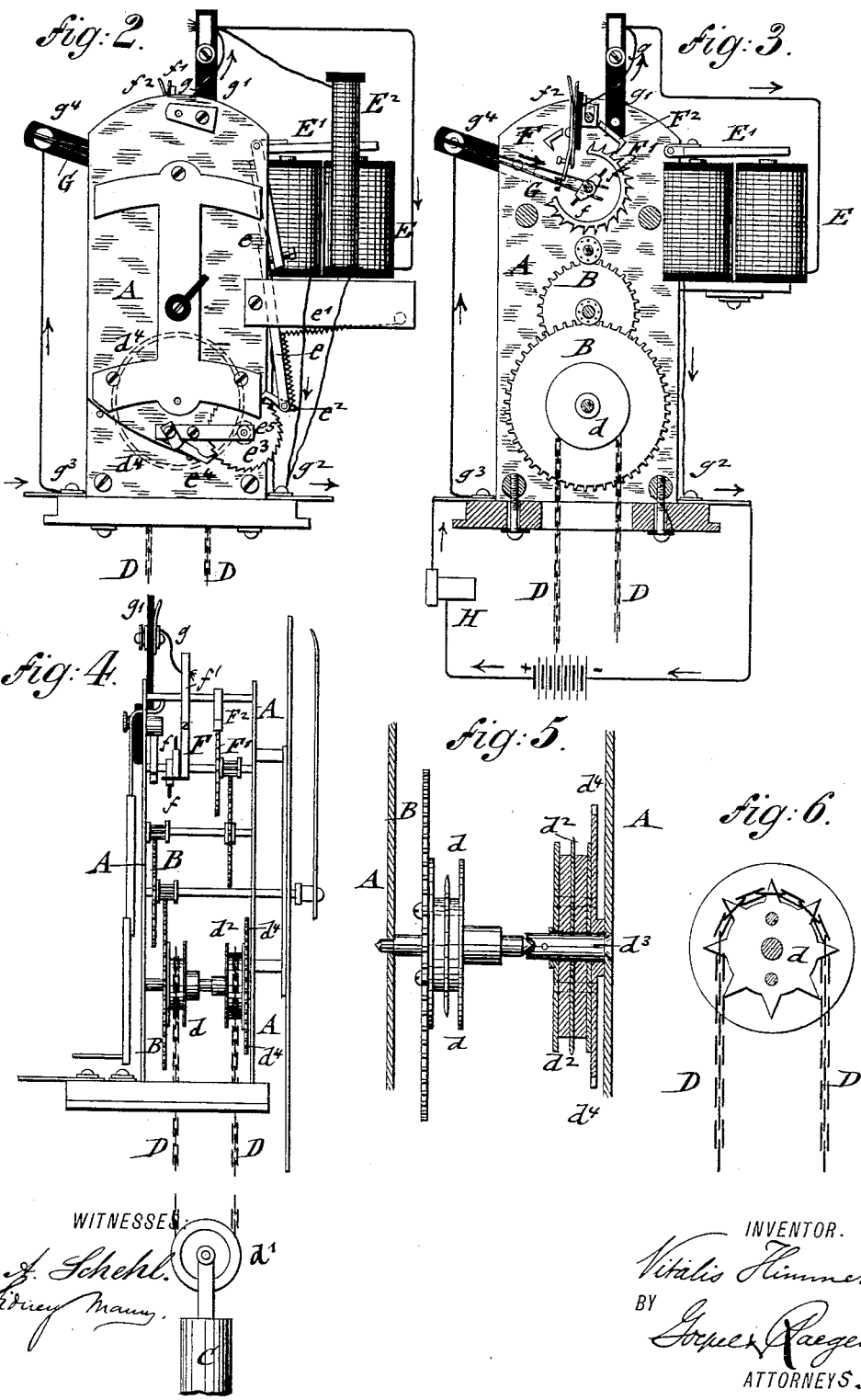

(No Model.) 3 Sheets—Sheet 3.
V. HIMMER.
ELECTRIC SELF WINDING CLOCK.
No. 391,969. Patented Oct. 30, 1888.
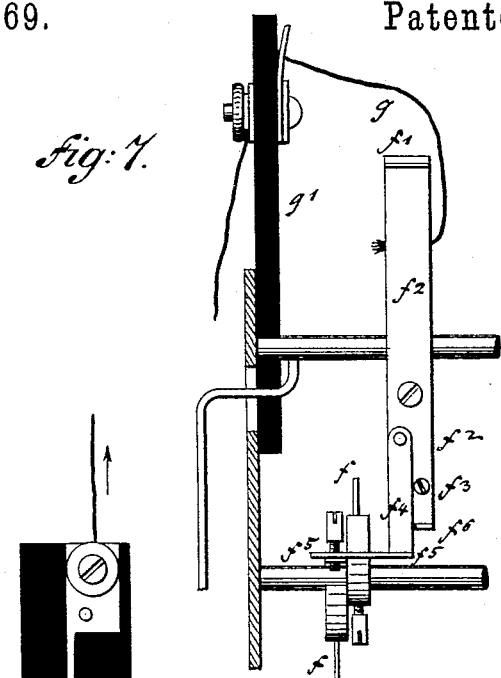
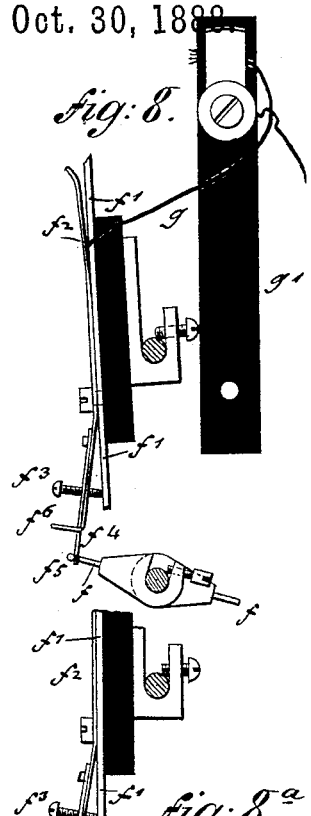
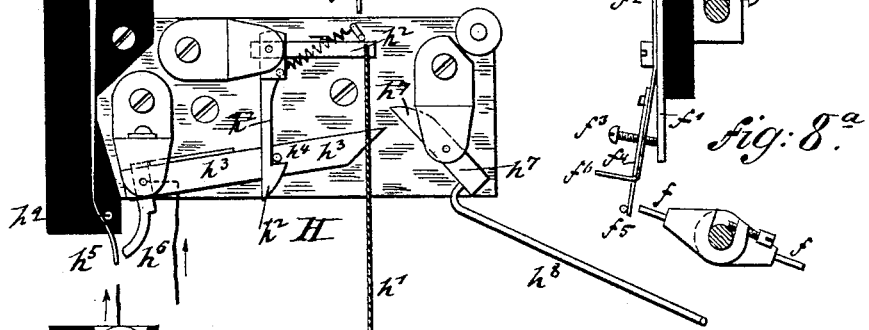
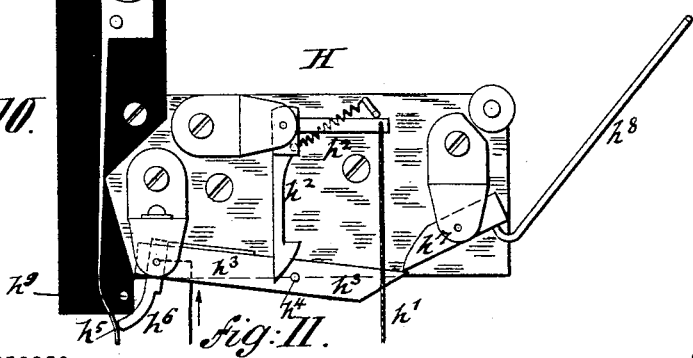

UNITED STATES PATENT OFFICE.

VITALIS HIMMER, OF NEW YORK, N. Y.

ELECTRIC SELF-WINDING CLOCK.

SPECIFICATION forming part of Letters Patent No. 391,969, dated October 30, 1888.

Application filed October 1, 1887. Serial No. 251,186. (No model.)

*To all whom it may concern:*

Be it known that I, VITALIS HIMMER, of the city, county, and State of New York, have invented certain new and useful Improvements in Electric Self-Winding Clocks, of which the following is a specification.

This invention relates to that class of clocks which are actuated directly by the force of the weight and wound up intermittently by the agency of electro-magnetism. In organizing electric clocks and clock systems it has been customary heretofore to propel each clock by means of a pawl-and-ratchet device or by an escapement, which in turn is actuated by an electro-magnet that is periodically vitalized by the movements of the clock-train. Clocks worked entirely by battery-power are expensive and unreliable, for the reason that the batteries employed, after having spent their main force, gradually run down, so that the current gets weaker and causes the irregular running of the clock, and finally the sudden stopping of the same without any premonitory indications of this condition of things. This objectionable feature of electric clocks has been sought to be remedied by providing suitable means—such as an electric motor—by which the mainspring is periodically wound to a predetermined tension and the normal condition of the clock re-established. By the introduction of an electric motor into the mechanism of electro-mechanical clocks, however, a new and complicated element is introduced, which is open to objections on the ground of getting easily out of order, and, further, that when the motor once stops or gets out of order the battery runs down entirely and has to be renewed, and that the clock requires the use of skilled workmen for being placed in running order again, which is connected with considerable annoyance and expense. Still another objection to these clocks is that the current is conducted in almost all cases through the clock-train and exerts an oxidizing influence on the oil used for lubricating the mechanisms, so that a retarding influence is thereby exerted on the train, impairing thereby after some time the regular running of the same.

The object of my invention is to overcome the defects referred to, and for this purpose I employ a clock that is driven by a weight in preference to a clock driven by a spring, as the weight always indicates to the eye the extent to which the clock has run down, and furnishes thereby a direct and visible notice that it requires rewinding whenever for some reason or other the battery should have given out. I further arrange in connection with the weight-driven clock-train an electrically-actuated winding mechanism, by which the clock is wound up to a certain extent, and then the battery periodically cut out and the clock worked by the weight in the same manner as ordinary weight-clocks. In other words, I employ the battery-current for winding up the clock, while simultaneously driving it by the action of the weight, and periodically cutting out the battery and running the clock by the force of the weight while suspending the operation of winding for the time, by which a considerable saving in battery-power is obtained.

The invention consists more specifically of an electric self-winding clock which is driven by a weight suspended from an endless driving-chain, one portion of which passes over a driving spur-wheel in gear with the clock-train, while the other portion passes over a winding spur-wheel that is intermittently actuated by pawl-and-ratchet devices operated by a transmitting-lever from the armature of an electro-magnet. The driving-weight of the clock-train sets automatically a circuit-controlling device by which the battery is either cut out or thrown into circuit, the current being interrupted when the weight arrives at its highest position by the action of the electric winding device, while it is thrown in the circuit again when it arrives at its lowermost position. During the descending action of the weight the clock is driven by the weight, while the ascending motion of the weight is produced by the action of the electric current and the winding mechanism, the clock being driven simultaneously by the weight without requiring any other force or maintaining power. The weight of the endless driving-chain is balanced by an auxiliary chain that is applied at one end by a traveling pulley to one end of the driving-chain and at the other end to the weight. Provision is made to conduct the current by metallic connections from the circuit-breaking device directly to the line-wires without passing through the clock-train, so as to prevent the oxidation of the lubricating-oil in the bearings of the same.

The constructive details will be fully described hereinafter, and finally pointed out in the claims.

In the accompanying drawings, which fully illustrate my invention, Figure 1 represents a front elevation of my improved electric self-winding clock. Figs. 1$^a$ and 1$^b$ show the disposition of the endless driving-chain and its connection with the driving and winding spur-wheels. Fig. 2 is a front elevation of the clock with the dial removed. Fig. 3 is a vertical section of the same with some of the parts broken away. Fig. 4 is a side elevaton of the movement taken at the left side of Fig. 2. Fig. 5 is a detail vertical transverse section of a part of the movement, showing the driving and winding spur-wheels drawn on a larger scale. Fig. 6 is a detail section of the driving spur-wheel with the endless driving-chain in position thereon. Figs. 7, 8, and 8$^a$ are details of the circuit-breaking mechanism; and Figs. 9, 10, and 11 are details of the circuit-controlling device, by which the battery is periodically cut out and thrown into circuit.

Similar letters of reference indicate corresponding parts.

In the drawings, A represents the frame of the clock-movement, and B the train of wheels, by which the power of the weight is transmitted for actuating the hour, minute, and seconds hands in the usual manner. The clock-train B is impelled by a driving-weight, C, which acts through the medium of an endless chain, D, on a driving spur-wheel, $d$, one portion or loop of the driving-chain D passing over a pulley, $d'$, of the driving-weight C, while the other portion or loop of the same passes from the pulley $d'$ over a winding spur-wheel, $d^2$, that is preferably arranged in front of the driving-wheel $d$ and mounted loosely on an independent arbor, $d^3$, that is rigidly attached to the frame A of the clock, as shown clearly in Fig. 5. The fixed arbor $d^3$ and the rotating arbor of the driving-wheel $d$ may be arranged in line with each other, in which case the end of the fixed arbor is provided with a socket-bearing for the conically-tapered end of the arbor of the driving-wheel, while the other end of the same turns in bearings of the clock-frame. The diameter of the winding spur-wheel $d^2$ is usually larger than that of the driving spur-wheel $d$, so that the weight C is raised higher by a single impulse of the lever than it can run down in the interval to the next impulse. The driving spur-wheel $d$ is attached to a primary gear-wheel of the clock-train B, so as to operate the latter, while the winding spur-wheel $d^2$ is attached to a gear-wheel, $d^4$, to which intermittent motion is imparted by a suitable driving mechanism from an electro-magnet, E, said driving mechanism consisting, preferably, of a lever, $e$, attached to the armature E' of the electro magnet E, said lever being acted upon by a tension-spring, $e'$, and provided at the lower end with a pivoted and spring-actuated pawl, $e^2$, that engages a ratchet-wheel, $e^3$, turning in bearings of the clock-frame A. The ratchet-wheel $e^3$ is engaged by a check-pawl, $e^4$, as shown in Fig. 2. On the arbor of the ratchet-wheel $e^3$ is mounted a pinion, $e^5$, that engages the gear-wheel $d^4$, and imparts, by the action of the electro-magnet and the driving mechanism described, intermittent motion to the winding spur-wheel $d^2$ whenever the electro-magnet E is placed in circuit with the battery by the circuit closing and breaking device F. The circuit-breaking device F continues its action regularly whether the electro-magnet is in circuit or cut out.

The electro-magnet E is mounted in any suitable manner on the clock-frame, its armature E' being pivoted to the same.

The circuit-breaking device F is operated in connection with the escapement F' of the clock-train, and consists of one or more platinum contact-points, $f f$, which are attached to the arbor of the escapement-wheel, and of an oscillating and insulated plate, $f'$, applied to the rock-shaft of the escapement-anchor F$^2$, the plate $f'$ being provided with a spring-plate, $f^2$, that is adjusted by a set screw, $f^3$, and provided with a spring, $f^4$, having a platinum contact-point, $f^5$, at its lower end, said spring being guided along a stud, $f^6$, at the lower end of the spring-plate $f^2$. The adjustable part $f^2$ serves to set the contact-point $f^5$ into proper relative position to the contact-points $f f$ on the arbor of the escapement-wheel, while the spring $f^4$, on which the contact $f^5$ is mounted, serves to provide a certain degree of elasticity to permit the pendulum to complete its oscillation without being hindered or retarded by a too great rigidity of the contact-points. The insulated plate $f'$ is connected by a flexible conducting-wire, $g$, to an insulated arm, $g'$, attached to the clock-frame A. The arm $g'$ is also electrically connected with the coils of the electro-magnet E and with an induction-coil, E$^2$, arranged in a shunt-circuit, the electro-magnet and induction coil being connected to a common binding-post, $g^2$, and from the same with the battery, as shown in Fig. 3.

The induction coil serves to prevent sparking at the contact-points in the usual manner. The binding-post $g^2$ is connected to one pole of the battery, while the other pole of the same is connected to a binding-post, $g^3$, at the opposite side of the slide brackets of the clock-frame. The binding-post $g^3$ is connected by a wire with an insulated arm, $g^4$, attached to the clock-frame A, which arm is connected by a double contact-spring, G, with the arbor of the escapement-wheel, as shown in Fig. 3, so that a direct metallic connection of said arbor with the double contact-spring G is produced. The current passes by this connection from the battery to the double contact-spring G and over the arbor of the escapement-wheel directly to the contact-points $ff$ of the circuit-breaking device F, and thence to the electromagnet E without passing through the clock-train itself. The current is thereby prevented from producing any oxidizing influence on the lubricating-oil in the bearings of the arbors of the clock-train, so that no retarding action is exerted on the journals of said arbors.

The driving-weight C is provided with a laterally-extending arm, $h$, which is connected by a string, $h'$, with one end of a fulcrumed and spring-actuated elbow-lever, $h^2$, which forms a part of the circuit-controlling device H, that is mounted on a supporting-plate applied to the clock case, as shown in Fig. 1. The connecting-cord $h'$ is of sufficient length to permit the weight C to pass into its lowermost position and then exert a strain on the cord. The lower end of the elbow-lever $h^2$ is made hook-shaped and extends sidewise of a fulcrumed lever, $h^3$, which is provided with a pin, $h^4$, that is engaged by the hook-shaped end of the elbow-lever $h^2$ whenever the lever $h^3$ is quickly lifted in upward direction by the action of a contact-spring, $h^5$, that presses on the rounded-off heel $h^6$ of the lever $h^3$. The upward motion of the lever $h^3$ is produced by a pivoted dog, $h^7$, which is provided with a bent wire-arm, $h^8$, that extends into the path of the laterally-extending arm $h$ of the weight C, so as to be lifted by said arm during the ascending motion of the weight C and produce thereby the gradual lowering of the lever $h^3$ by the pressure of the dog $h^7$, until the lever $h^3$ assumes the position shown in Fig. 10 and presses against the contact-spring $h^5$, which is set to tension by the heel $h^6$. At the moment when the dog $h^7$ releases the lever $h^3$ it is quickly propelled in upward direction, so that its pin $h^4$ is engaged by the hook-shaped end of the elbow-lever $h^2$ and locked in this position, as shown in Fig. 9. The heel of the lever $h^3$ is thereby moved out of contact with the spring $h^5$, which latter is retained by a stop-pin, $h^9$, as shown in Figs. 9 and 10.

The contact-spring $h^5$ of the circuit-controller H and the lever $h^3$ are placed in circuit with the battery, as indicated in connection with Figs. 3 and 9. The moment the contact between the lever $h^3$ and the spring $h^5$ is interrupted the battery-circuit is broken. This takes place when the weight arrives at its highest point, the clock being at this point fully wound. The weight C then gradually descends and produces the gradual lowering of the bent arm $h^8$ of the dog $h^7$. When the weight C arrives at its lowermost position, the connecting-cord $h$ exerts a tension on the elbow-lever $h^2$, so as to release the same from the pin $h^4$ of the pivoted lever $h^3$, whereby the contact of the heel $h^6$ of said lever with the contact-spring $h^5$ is re-established, and thereby the battery thrown in circuit with the circuit-controller, circuit-breaker, and electro-magnet, so that the rewinding of the weight by the force of the battery and the winding mechanism operated by the electro-magnet takes place again.

For the purpose of balancing or equalizing the weight of the endless driving-chain D as the same shifts from one side to the other, a balancing-chain, D', of the same length and weight is applied to the lower end of the weight C and to a hook of a pulley, $D^2$, through which one loop of the endless chain D is passed, as shown clearly in the diagrams, Figs. 1ª and 1ᵇ. The balancing-chain D' follows the motion of the endless chain D in every position of the same, so as to equalize the weight of the driving-chain D and prevent thereby any irregular running of the clock-train, which would be caused by the weight of the endless chain as the same is shifted from one side to the other of the driving and winding spur-wheels. In place of the balance-chain a balance-weight may be applied to the pulley $D^2$.

The operation of my improved electric self-winding clock is as follows: It will be observed that the clock-train is always driven by the action of the weight. During the descending motion of the weight the battery is cut out, and consequently the electro-magnet and its transmitting mechanism are in a position of rest. When the weight arrives at its lowermost point, it operates by its connecting-string the circuit-controlling device, and closes thereby the circuit of the battery. This has the effect that the electro-magnet is periodically vitalized by the circuit-breaking device, and operates thereby the winding mechanism and winds up the weight. Owing to the driving action exerted by the weight on the endless chain, this intermittent lifting of the weight exerts no influence on the clock-train itself, the result being that the weight is raised by the intermittent action of the winding mechanism to a greater extent than it can descend in the intervals of time during which the winding mechanism is not actuated. The quicker or slower winding up of the weight depends on the frequency by which contacts of the circuit-breaking device are made. When the weight by the action of the electric winding mechanism approaches its highest position, the laterally-extending arm of the weight engages the bent arm of the circuit-controller, so as to gradually lower the pivoted lever of the same against the tension of its contact-spring until the lever is released and quickly sprung in upward direction, so as to be engaged by the elbow-lever of the circuit-controller and locked in position. This produces the interruption of the circuit and the cutting out the clock. The clock continues now to run by the action of the weight, as no winding of the weight takes place until the same arrives at its lowermost position and releases by its connecting-string the contact-lever of the circuit-controller, so that the same establishes the battery-circuit again, by which the winding up of the weight again is accomplished. In this manner the weight is wound up during certain periods of time by the power of the battery and the winding mechanism, while for another period of time the battery and winding mechanism are cut out and the clock-train actuated by the weight without any winding action taking place.

The balancing-chain and the devices for preventing the oxidizing of the lubricating-oil in the clock-train all assist in keeping up the regular running action of the train, so that very little time and labor are required for regulating the clock, as the clock, when once regulated, is not liable to get out of order.

The advantages of my improved electric self-winding clock are that in case of the running down of the battery, or in case of any accidental injury to the same or the winding mechanism, the clock can be kept running for any length of time until the battery is replaced by winding up the clock in the usual manner by hand. It works then like a common clock driven by its own weight. The weight serves as an indicator that the clock is in proper running order, and removes a serious cause of dissatisfaction with electric clocks—namely, the inability of the user to ascertain at any time whether the clock is in running order or not. As the battery is only used as the motive force for winding up the clock and not for driving the same, for which purpose the weight is exclusively used, a considerable saving in battery-power is obtained. As the circuit is only closed when the pendulum arrives at one end or the other of its oscillation, while it is always open when at the center of the same, the battery can not run down in case of the stopping of the clock.

Having thus described my invention, I claim as new and desire to secure by Letters Patent—

1. The combination, with a clock-train, of and endless driving-chain, a movable weight suspended from said chain, an electric winding mechanism, and a circuit-controller that is periodically actuated by the weight, so as to throw the winding mechanism in or out of circuit, substantially as set forth.

2. The combination, with a clock-train, of an endless driving-chain, a movable weight applied to one loop, a balancing chain or weight applied to the other loop of said chain, an electric winding mechanism, and a circuit-controller that is periodically actuated by the driving-weight, so as to throw the winding mechanism in or out of circuit, substantially as set forth.

3. The combination of a clock train, an endless driving-chain, a movable weight applied to one loop of said chain, a circuit-breaking device operated by the clock-train, an electro-magnet placed in circuit with the circuit-breaking device, and a winding mechanism actuated by the electro-magnet and adapted to wind up the driving-chain and weight, substantially as set forth.

4. The combination of a clock-train, an endless driving-chain, a movable weight applied to one loop of said chain, a circuit-breaking device operated by the clock-train, an electro-magnet, a circuit-controller placed in circuit with the circuit-breaker and electro-magnet, and a winding mechanism actuated by the electro-magnet, so as to cause the winding up of the driving-chain and weight when the circuit is closed and the interrupting of the circuit while the weight is running down, substantially as set forth.

5. The combination of a clock-train having a driving spur-wheel and a winding spur-wheel, an endless chain passing over both spur-wheels, a movable weight hung to one loop of said chain, a balancing weight or chain connected to the other loop of the endless chain, a circuit-breaking device, an electro-magnet placed in circuit with the same, and a winding mechanism connecting the armature with the winding spur-wheel for intermittently winding up the driving weight and chain, substantially as set forth.

6. The combination of a clock-train having a driving spur-wheel and a winding spur-wheel, an endless chain passing over both spur-wheels, a movable driving-weight applied to one loop of the chain, a balancing weight or chain applied to the other loop of the endless chain, an intermittently-actuated circuit-breaker, an electro-magnet, a motion-transmitting mechanism connecting the armature of the electro-magnet with the winding spur-wheel, and a circuit-controller placed in circuit with the circuit-breaker and electro-magnet and periodically actuated by the driving-weight, substantially as set forth.

7. The combination of a clock-train, an endless driving-chain, a movable driving-weight applied to one loop of said chain, an electric winding mechanism, a circuit controller composed of a fulcrumed contact-lever, a releasing-dog and a locking elbow-lever, a laterally-extending arm on the driving-weight engaging said dog, and a string connecting said arm with the locking-lever of the circuit-controller, so as to interrupt the circuit when the weight arrives at its highest position and close the circuit when it arrives at its lowest position, substantially as set forth.

8. The combination of a clock-train, an endless driving-chain, a movable weight applied to one loop of the said chain, a balancing chain or weight applied to the other loop, an electric winding mechanism, a battery for actuating said winding mechanism, and a circuit-controller actuated periodically by the driving-weight for throwing the winding mechanism in or out of circuit with the battery, so as to cause the intermittent winding up of the weight by the winding mechanism or the cutting out of the same and the running of the clock while suspending the operation of winding for the time, substantially as set forth.

9. In an electric self-winding clock, the combination of a clock-train, an oscillating contact-spring on the rock-shaft of the escapement-anchor, contact-points on the arbor of the escapement-wheel, an insulated double spring forming contact with said arbor, a circuit-controller, a battery, and an electric winding mechanism, said double spring being electrically connected with the circuit-controller adapted to conduct the current directly to the circuit-breaking devices without passing through the clock-train, substantially as set forth.

10. In an electric self-winding clock, a circuit-controller consisting of a fulcrumed lever having a contact-heel at one end, a contact-spring, a pivoted dog engaging the opposite end of the lever, and a fulcrumed and spring-actuated locking-lever adapted to engage a pin on the main lever, substantially as set forth.

11. In an electric self-winding clock, a circuit-breaker consisting of an insulated plate applied to the rock-shaft of the escapement-anchor, a spring on said plate, a screw for setting the lower end of said spring, a yielding spring-contact at the lower end of said spring, and contact-points on the arbor of the escapement-wheel, substantially as set forth.

In testimony that I claim the foregoing as my invention I have signed my name in presence of two subscribing witnesses.

VITALIS HIMMER.

Witnesses:
PAUL GOEPEL,
SIDNEY MANN.